US012656971B2

(12) United States Patent
Chen et al.

(10) Patent No.: US 12,656,971 B2
(45) Date of Patent: Jun. 16, 2026

(54) LIVE CONTAINER MIGRATION WITH MINIMAL PRODUCTION SYSTEM IMPACT

(71) Applicant: International Business Machines Corporation, Armonk, NY (US)

(72) Inventors: Xiao Ling Chen, Beijing (CN); Zhan Peng Huo, Beijing (CN); Yan Fei Qin, Beijing (CN); Sheng Shuang Li, Beijing (CN); Wen Bin Han, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 18/929,770

(22) Filed: Oct. 29, 2024

(65) Prior Publication Data

US 2026/0119067 A1      Apr. 30, 2026

(51) Int. Cl.
G06F 3/06          (2006.01)

(52) U.S. Cl.
CPC .......... G06F 3/0647 (2013.01); G06F 3/0617 (2013.01); G06F 3/067 (2013.01)

(58) Field of Classification Search
CPC ....... G06F 3/0647; G06F 3/0617; G06F 3/067
See application file for complete search history.

(56) References Cited

U.S. PATENT DOCUMENTS 10,768,973 B1 *    9/2020   Jin ........................ G06F 16/178
11,249,815 B2      2/2022   Bourbonnais et al.

2016/0359955 A1 *   12/2016   Gill ..................... H04L 67/1097
2017/0083541 A1 *    3/2017   Mann .................... G06F 16/119
2018/0074748 A1 *    3/2018   Makin ................... G06F 9/4856
2020/0104385 A1 *    4/2020   Zheng ................. G06F 9/45558
2023/0035367 A1      2/2023   Tatiparthi et al.
2024/0192942 A1      6/2024   Sauer et al.

OTHER PUBLICATIONS

Junior, et al., Stateful Container Migration in Geo-Distributed Environments, 12th IEEE International Conference on Cloud Computing Technology and Science (CloudCom), Oct. 12, 2020, 10 pages.
International Searching Authority, "Notification of Transmittal of the International Search Report and the Written Opinion of the International Searching Authority, or Declaration," Patent Cooperation Treaty, Jan. 7, 2026, 10 pages, International Application No. PCT/EP2025/079469.
Ma et al. "Efficient Live Migration of Edge Services Leveraging Container Layered Storage", IEEE Transactions on Mobile Computing, Sep. 2019, 14 pages, vol. 18, Issue No. 9.

* cited by examiner

*Primary Examiner* — Eric T Loonan
(74) *Attorney, Agent, or Firm* — Yee & Associates, P.C.

(57)          ABSTRACT

Live container migration management is provided. A read and write logical sub container layer that includes a set of changed files within a container layer of a first container is utilized to continue processing inputs and outputs corresponding to a service provided by the first container to avoid interruption of the service during live migration. A read only logical sub container layer that includes a plurality of original files within the container layer of the first container is copied to another container layer of a second container running on a second computer for the live migration without building the second container using a container image during the live migration.

20 Claims, 10 Drawing Sheets

COMPUTING ENVIRONMENT
100

LIVE CONTAINER MIGRATION
MANAGEMENT SYSTEM
201

LOGICAL SUB-CONTAINER LAYER
GENERATION PROCESS
500

FIG. 9A

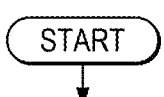

START

902 — RECEIVE, BY A FIRST COMPUTER, AN INPUT TO PERFORM A LIVE MIGRATION OF A FIRST CONTAINER FROM THE FIRST COMPUTER TO A SECOND CONTAINER LOCATED ON A SECOND COMPUTER IN A CONTAINER-BASED ENVIRONMENT, THE FIRST CONTAINER PROVIDES A SERVICE CORRESPONDING TO A PRODUCTION SYSTEM AND INCLUDES ONE OR MORE IMAGE LAYERS AND A CONTAINER LAYER, THE SECOND COMPUTER PULLS A CONTAINER IMAGE CORRESPONDING TO THE FIRST CONTAINER FROM A CONTAINER IMAGE REGISTRY AND RUNS THE SECOND CONTAINER ON THE SECOND COMPUTER USING THE CONTAINER IMAGE

904 — RECEIVE, BY THE FIRST COMPUTER, A RESULT OF A HEALTH CHECK OF THE SECOND CONTAINER RUNNING ON THE SECOND COMPUTER

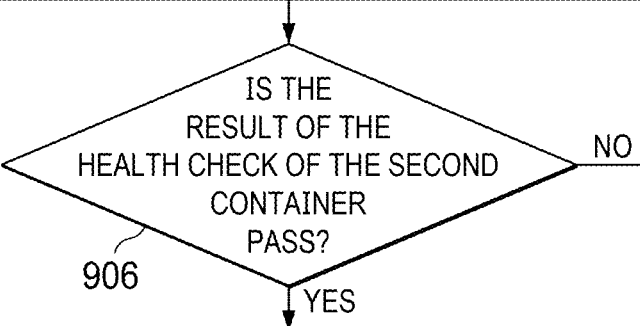

906   IS THE RESULT OF THE HEALTH CHECK OF THE SECOND CONTAINER PASS?   NO

YES

908 — IDENTIFY, BY THE FIRST COMPUTER, A SET OF CHANGED FILES WITHIN A PLURALITY OF ORIGINAL FILES INCLUDED IN THE CONTAINER LAYER OF THE FIRST CONTAINER USING A DIFFERENCE FOLDER DIRECTORY CORRESPONDING TO THE FIRST CONTAINER

910 — UTILIZE, BY THE FIRST COMPUTER, THE PLURALITY OF ORIGINAL FILES IN THE CONTAINER LAYER OF THE FIRST CONTAINER AS A FIRST LOGICAL SUB-CONTAINER LAYER WITHIN THE CONTAINER LAYER

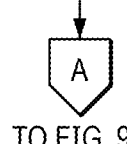

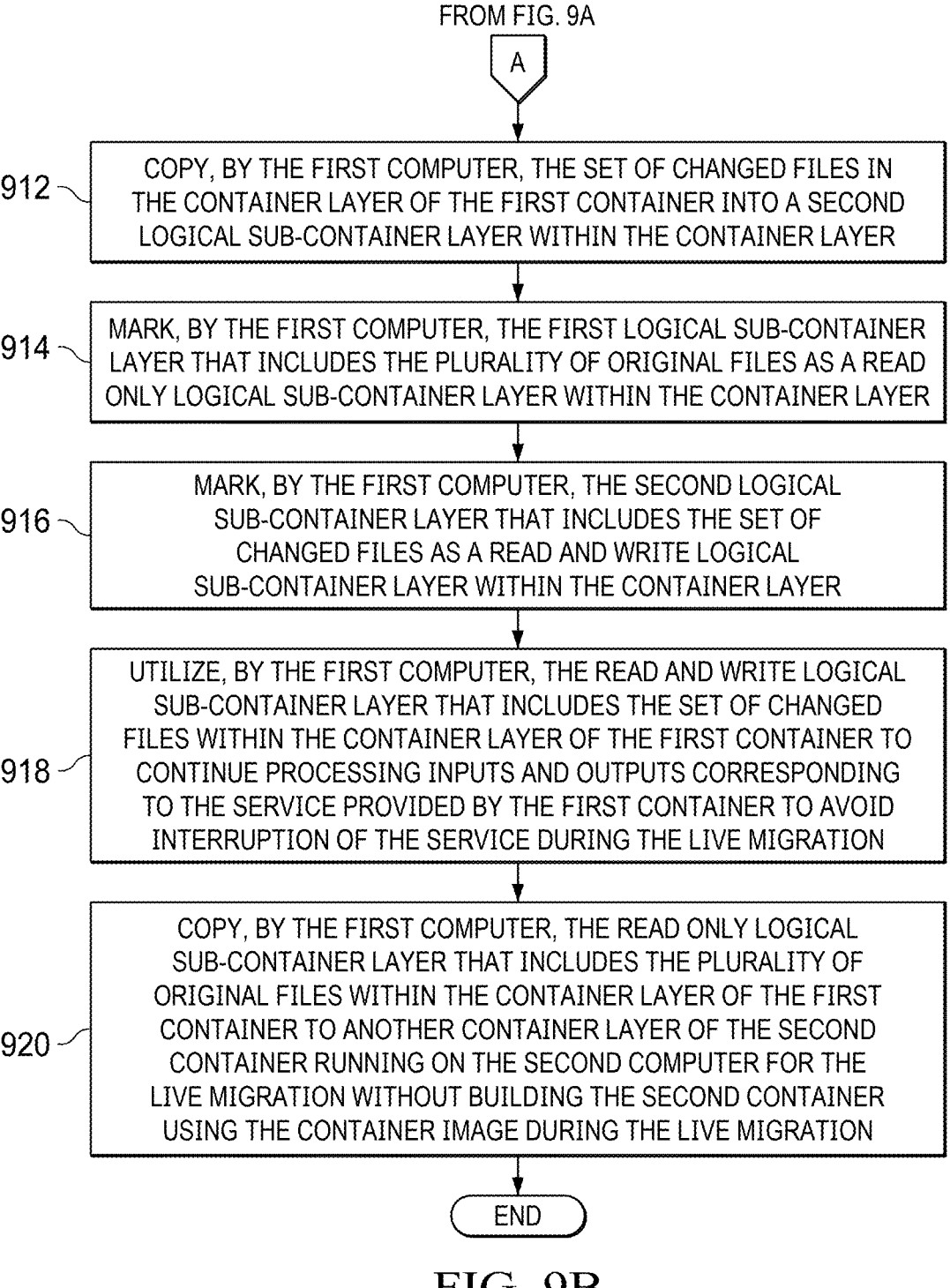

FROM FIG. 9A

A

912 — COPY, BY THE FIRST COMPUTER, THE SET OF CHANGED FILES IN THE CONTAINER LAYER OF THE FIRST CONTAINER INTO A SECOND LOGICAL SUB-CONTAINER LAYER WITHIN THE CONTAINER LAYER

914 — MARK, BY THE FIRST COMPUTER, THE FIRST LOGICAL SUB-CONTAINER LAYER THAT INCLUDES THE PLURALITY OF ORIGINAL FILES AS A READ ONLY LOGICAL SUB-CONTAINER LAYER WITHIN THE CONTAINER LAYER

916 — MARK, BY THE FIRST COMPUTER, THE SECOND LOGICAL SUB-CONTAINER LAYER THAT INCLUDES THE SET OF CHANGED FILES AS A READ AND WRITE LOGICAL SUB-CONTAINER LAYER WITHIN THE CONTAINER LAYER

918 — UTILIZE, BY THE FIRST COMPUTER, THE READ AND WRITE LOGICAL SUB-CONTAINER LAYER THAT INCLUDES THE SET OF CHANGED FILES WITHIN THE CONTAINER LAYER OF THE FIRST CONTAINER TO CONTINUE PROCESSING INPUTS AND OUTPUTS CORRESPONDING TO THE SERVICE PROVIDED BY THE FIRST CONTAINER TO AVOID INTERRUPTION OF THE SERVICE DURING THE LIVE MIGRATION

920 — COPY, BY THE FIRST COMPUTER, THE READ ONLY LOGICAL SUB-CONTAINER LAYER THAT INCLUDES THE PLURALITY OF ORIGINAL FILES WITHIN THE CONTAINER LAYER OF THE FIRST CONTAINER TO ANOTHER CONTAINER LAYER OF THE SECOND CONTAINER RUNNING ON THE SECOND COMPUTER FOR THE LIVE MIGRATION WITHOUT BUILDING THE SECOND CONTAINER USING THE CONTAINER IMAGE DURING THE LIVE MIGRATION

END

FIG. 9B

LIVE CONTAINER MIGRATION WITH MINIMAL PRODUCTION SYSTEM IMPACT

BACKGROUND

The disclosure relates generally to container-based environments and more specifically to migrating containers.

A container-based environment, architecture, platform, or the like, such as, for example, Kubernetes® (a registered trademark of the Linux Foundation of San Francisco, CA, USA), provides a structural design for automating deployment, scaling, and operations of containers across host nodes. A host node is a machine, either physical or virtual, where containers (i.e., application workloads) are deployed. A container is a version of a container image and is ready to run as an application, which corresponds to a service. In other words, the container image becomes the container at runtime. The container image is an executable package of software that includes everything needed to run the application (e.g., code, runtime, system tools, system libraries, settings, and the like).

SUMMARY

According to one illustrative embodiment, a method is provided. A first computer utilizes a read and write logical sub container layer that includes a set of changed files within a container layer of a first container to continue processing inputs and outputs corresponding to a service provided by the first container to avoid interruption of the service during live migration. The first computer copies a read only logical sub container layer that includes a plurality of original files within the container layer of the first container to another container layer of a second container running on a second computer for the live migration without building the second container using a container image during the live migration. According to other illustrative embodiments, a computer system and computer program product are provided.

BRIEF DESCRIPTION OF THE DRAWINGS

FIGS. 9A-9B are a flowchart illustrating a process for managing live container migration in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
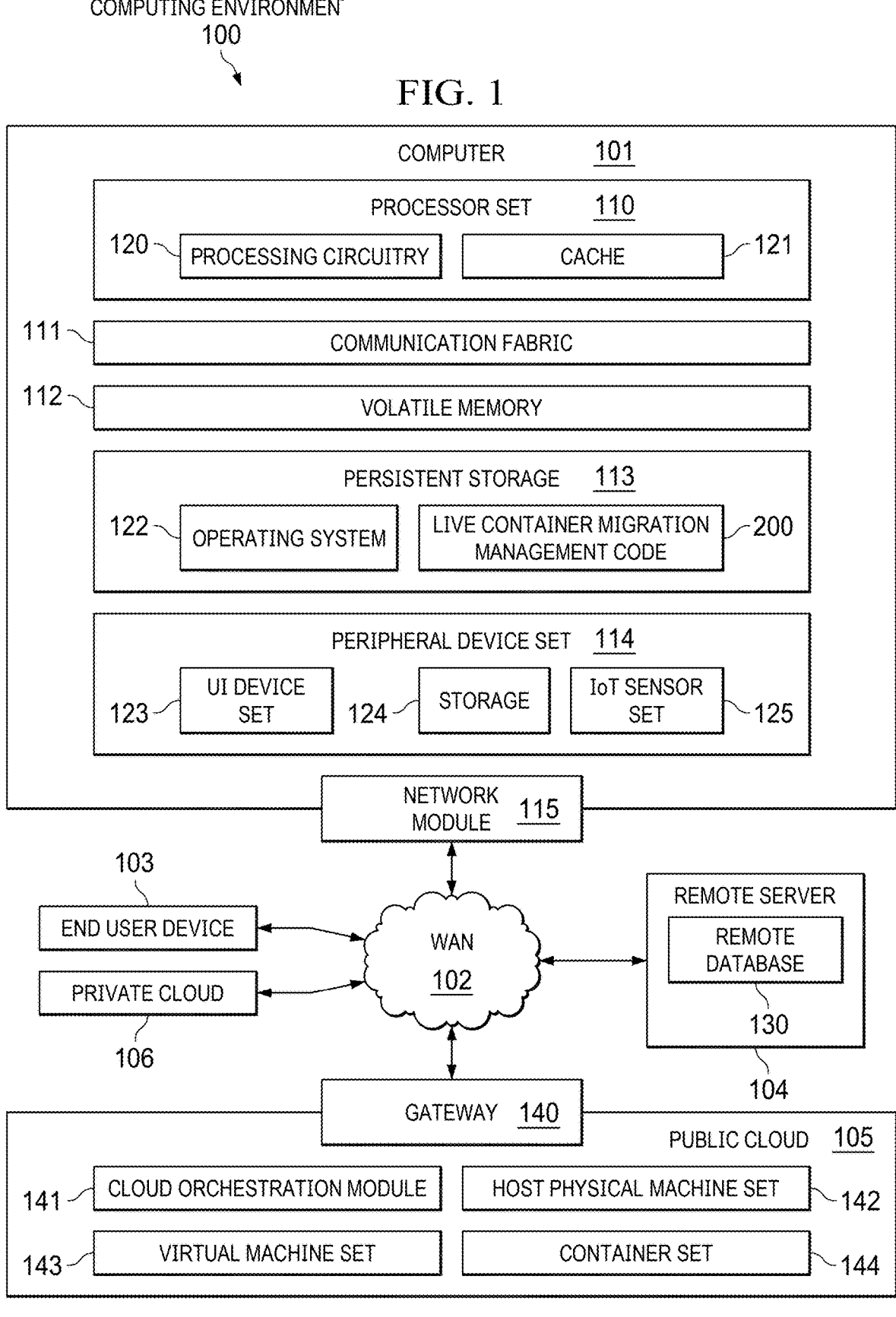
FIG. 1 is a pictorial representation of a computing environment in which illustrative embodiments may be implemented.
Figure 2:
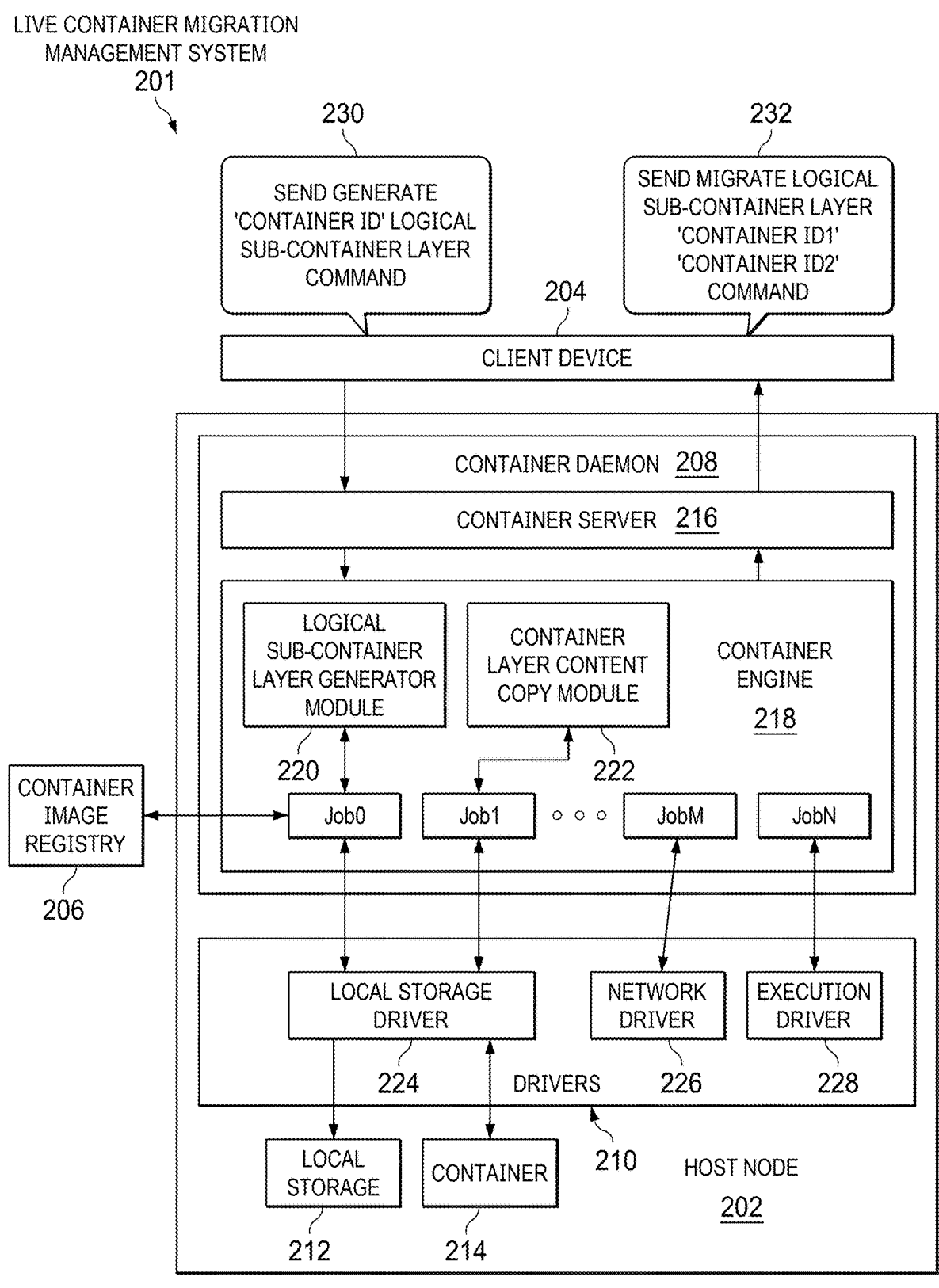
FIG. 2 is a diagram illustrating an example of a live container migration management system in accordance with an illustrative embodiment.

FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of a container-based environment for the execution of at least some of the computer code involved in performing the inventive methods of illustrative embodiments, such as live container migration management code 200. For example, in response to receiving an input to perform a live migration of a container that is providing a service corresponding to a production system to another computer or host node, live container migration management code 200 identifies a set of changed files in a container layer of the container using a difference folder directory, generates a logical sub container layer that includes the changed files in the container layer, and then copies the logical sub container layer of the container to a container layer of another container running on the other computer for the live migration to prevent interruption of the service. It should be noted that the other computer can be located at the same site or a different site.

In addition to live container migration management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and live container migration management code 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a server, mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips.

Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in live container migration management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a system administrator who utilizes the live container migration management services provided by computer 101), and may take any of the forms discussed above in connection with computer 101. EUD 103 typically receives helpful and useful data from the operations of computer 101. For example, in a hypothetical case where computer 101 is designed to provide a container migration recommendation to the end user, this recommendation would typically be communicated from network module 115 of computer 101 through WAN 102 to EUD 103. In this way, EUD 103 can display, or otherwise present, the container migration recommendation to the end user. In some embodiments, EUD 103 may be a client device, such as a thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a container migration recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (Saas) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Because of the increase of container-based technology, container-based technology is widely used in many areas. For example, many production systems (e.g., banking systems, financial systems, payment systems, transaction system, healthcare systems, and the like) utilize container-based technology for deployment of services. To manage disasters, productions systems need to migrate running containers. However, migrating a container from one site to another site may take a long time and the service provided by the container may be interrupted during the container migration process. For production systems, service interruption is unacceptable.

Using current container-based technology, in order to migrate a container from one site to another, the container needs to be committed or built to a new container image and stored in a container image registry. Afterward, the other site pulls the new container image from the container image registry and then starts a container on the site using the new container image. As a result, container migration to a new site takes time using current container-based technology. However, the less impact there is on a production system during container migration, the better. As a result, a need exists for seamless live container migration from one site to another.

Illustrative embodiments enable seamless live migration of a running container from one site to another. This seamless live container migration of illustrative embodiments has minimal (e.g., zero or negligible) impact to product systems and is seamless to users of production system services. Illustrative embodiments achieve this seamless live container migration with minimal impact on production systems by identifying changed files in a container layer of a container using a difference folder directory, generating a logical sub container layer that contains the changed files in the container layer, and then copying the logical sub container layer of the container to another container located on another site. Thus, illustrative embodiments do not need to commit or build a container to a new container image during the migration process, but just copy the changed files of the container layer to another container with minimal impact to the production system.

Illustrative embodiments base logical sub container layers on the existing container layer structure of a container. Illustrative embodiments utilize a new "generate 'container id' logical sub container layer" command to trigger a new logical sub container layer generator module of illustrative embodiments. The logical sub container layer generator module generates a plurality of logical sub container layers (e.g., a read and write logical sub container layer and a read only logical sub container layer that contains any changed files) within the container layer of the container. For example, the logical sub container layer generator module executes the "generate 'container id' logical sub container layer" command and copies all changed files (e.g., updated or new files) within the original container layer to a new logical sub container layer. The logical sub container layer generator module marks this new logical sub container layer as a read and write logical sub container layer for the running container to utilize during migration to continue processing inputs and outputs corresponding to the service provided by the container to avoid service interruption. The logical sub container layer generator module also marks the original container layer with the original or unchanged files as a read only logical sub container layer for migration to another container layer of another container.

In addition, illustrative embodiments also utilize a new "migrate logical sub container layer 'container id1' 'container id2'" command to trigger a new container layer content copy module of illustrative embodiments. The container layer content copy module executes the "migrate logical sub container layer 'container id1' 'container id2'" command and copies each of the one or more read only logical sub container layers of the container layer to another container layer of another container for migration to another site.

The logical sub container layer generator module and the container layer content copy module of illustrative embodiments are independent of each other, but cooperate with each other during the whole seamless live container migration process of illustrative embodiments. Thus, illustrative embodiments provide continuous availability of a container by eliminating the time of input and output outage to ensure the normal and stable operation of production system services.

Thus, illustrative embodiments provide one or more technical solutions that overcome a technical problem with service interruption during container migration. As a result, these one or more technical solutions provide a technical effect and practical application in the field of container-based environments.

With reference now to FIG. 2, a diagram illustrating an example of a live container migration management system is depicted in accordance with an illustrative embodiment. Live container migration management system 201 may be implemented in a container-based environment, such as computing environment 100 in FIG. 1. Live container migration management system 201 is a system of hardware and software components for performing seamless live migration of running a container from one location to another to avoid service interruption.

In this example, live container migration management system 201 includes host node 202, client device 204, and container image registry 206. Host node 202 can be, for example, computer 101 in FIG. 1. Client device 204 can be, for example, EUD 103 in FIG. 1. Container image registry 206 can be, for example, remote database 130 in FIG. 1. Container image registry 206 stores a plurality of different container images. However, it should be noted that live container migration management system 201 is intended as an example only and not as a limitation on illustrative embodiments. For example, live container migration management system 201 can include any number of host nodes, client devices, container image registries, and other devices and components not shown.

In this example, host node 202 includes container daemon 208, drivers 210, local storage 212, and container 214. Container daemon 208 provides the runtime environment for containers, such as container 214, running on host node 202. Container daemon 208 includes container server 216 and container engine 218. Container engine 218 includes logical sub container layer generator 220 and container layer content copy module 222.

In this example, drivers 210 include local storage driver 224, network driver 226, and execution driver 228. Logical sub container layer generator module 220 utilizes local storage driver 224 to manage layers of container 214 in local storage 212.

Host node 202 utilizes container 214 to execute an application workload that provides a service corresponding to a production system. Host node 202 runs container 214 using one or more container images stored in local storage 212. Container 214 includes one or more image layers and a container layer. Container 214 can represent a plurality of different containers.

At 230, a user (e.g., system administrator or the like) of client device 204 sends a "generate 'container id' logical sub container layer" command to logical sub container layer generator module 220 via container daemon 208 and container engine 218 of host node 202. In response to receiving the "generate 'container id' logical sub container layer" command, logical sub container layer generator module 220 identifies a set of changed files in a container layer of container 214 using a difference folder directory. In addition, logical sub container layer generator module 220 generates a logical sub container layer that includes the set of changed files in the container layer of container 214.

At 232, the user of client device 204 also sends a "migrate logical container layer 'container id1' 'container id2'" command to container layer content copy module 222 via container daemon 208 and container engine 218 of host node 202. In response to receiving the "migrate logical container layer 'container id1' 'container id2'" command, container layer content copy module 222 copies the logical sub container layer that includes the set of changed files in the container layer of container 214 to a container layer of another container running on another host node either located at the same site or a different site for live migration to prevent service interruption.

Figure 3:
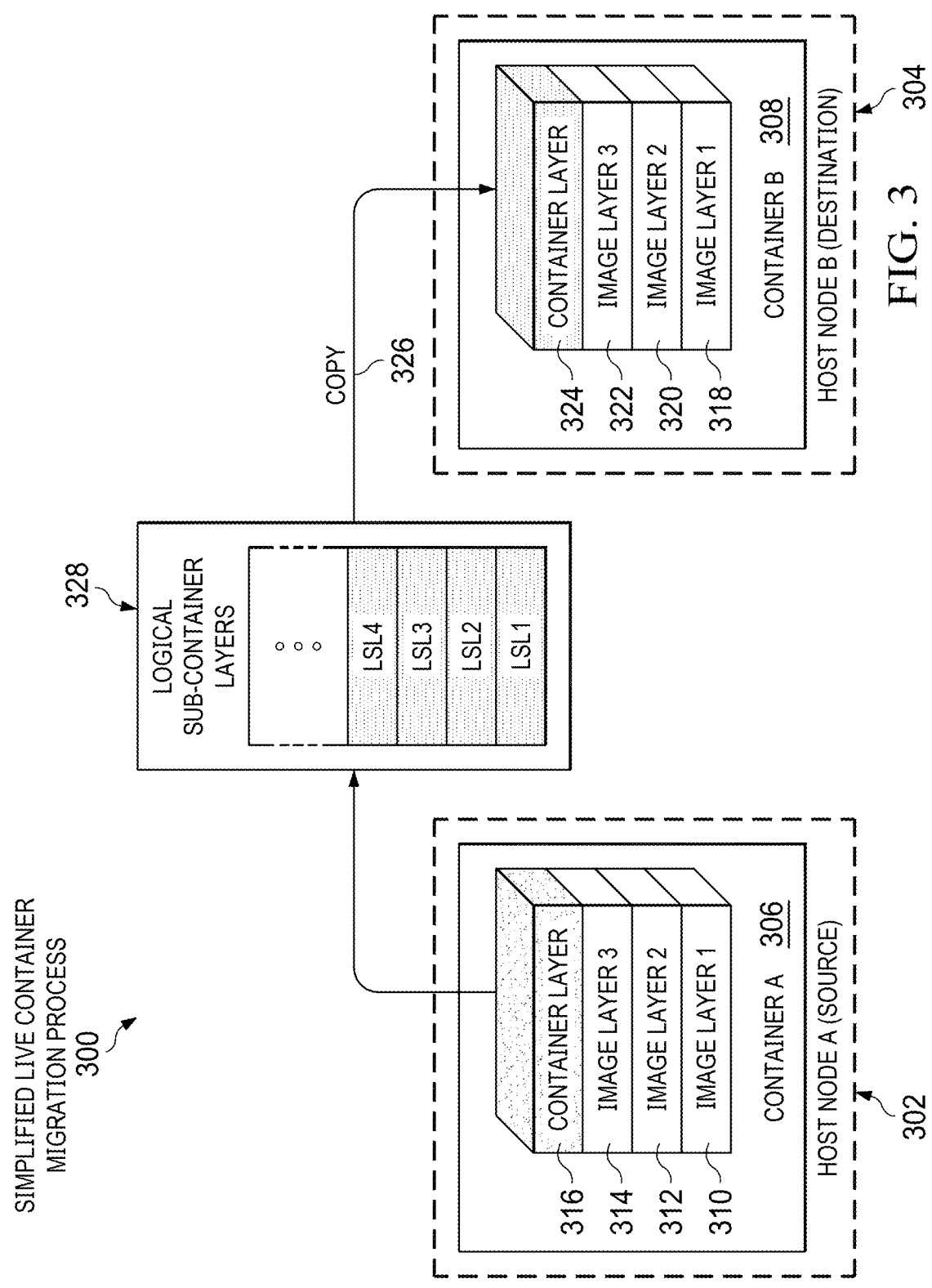
FIG. 3 is a diagram illustrating an example of a simplified live container migration process in accordance with an illustrative embodiment.

With reference now to FIG. 3, a diagram illustrating an example of a simplified live container migration process is depicted in accordance with an illustrative embodiment. Simplified live container migration process 300 may be implemented in a container-based environment, such as computing environment 100 in FIG. 1.

Simplified live container migration process 300 includes host node A 302, which is a source node, and host node B 304, which is a destination node for container migration. Host node A 302 may be, for example, computer 101 in FIG. 1 or host node 202 in FIG. 2. Host node B 304 may be, for example, one of host physical machine set 142 or virtual machine set 143 in FIG. 1. However, it should be noted that simplified live container migration process 300 is intended as an example only and not as a limitation on illustrative embodiments. For example, live container migration process 300 may include any number of destination host nodes for container migration from a source host node.

In this example, hosts node A 302 is running container A 306 and host node B 304 is running container B 308. Container A 306 includes image layer 1 310, image layer 2 312, image layer 3 314, and container layer 316. Host node A 302 utilizes image layer 1 310, image layer 2 312, and image layer 3 314 during different stages of building container A 306. Each of image layer 1 310, image layer 2 312, and image layer 3 314 is a read only layer. Container layer 316 is a read and write layer. Thus, container layer 316 is a working layer that receives inputs and outputs for container A 306, which is providing a service corresponding to a production system. Container B 308 is similar to container A 306. For example, container B 308 includes image layer 1 318, image layer 2 320, image layer 3 322, and container layer 324.

At 326, host node A 302 copies logical sub container layers 328 to container layer 324 of container B 308 running on host node B 304 for live container migration.

Each of logical sub container layers 328 (e.g., logical sub layer (LSL) 1, LSL 2, LSL 3, and LSL 4) represents a state of container layer 316 prior to changes in files comprising container layer 316 over time. In this example, there have been four different changes to files in container layer 316 at different points in time. For example, LSL 1 represents a first set of file changes to container layer 316 at time T1, LSL 2 represents a second set of file changes at time T2, LSL 3 represents a third set of file changes at time T3, and so on.

Figure 4:
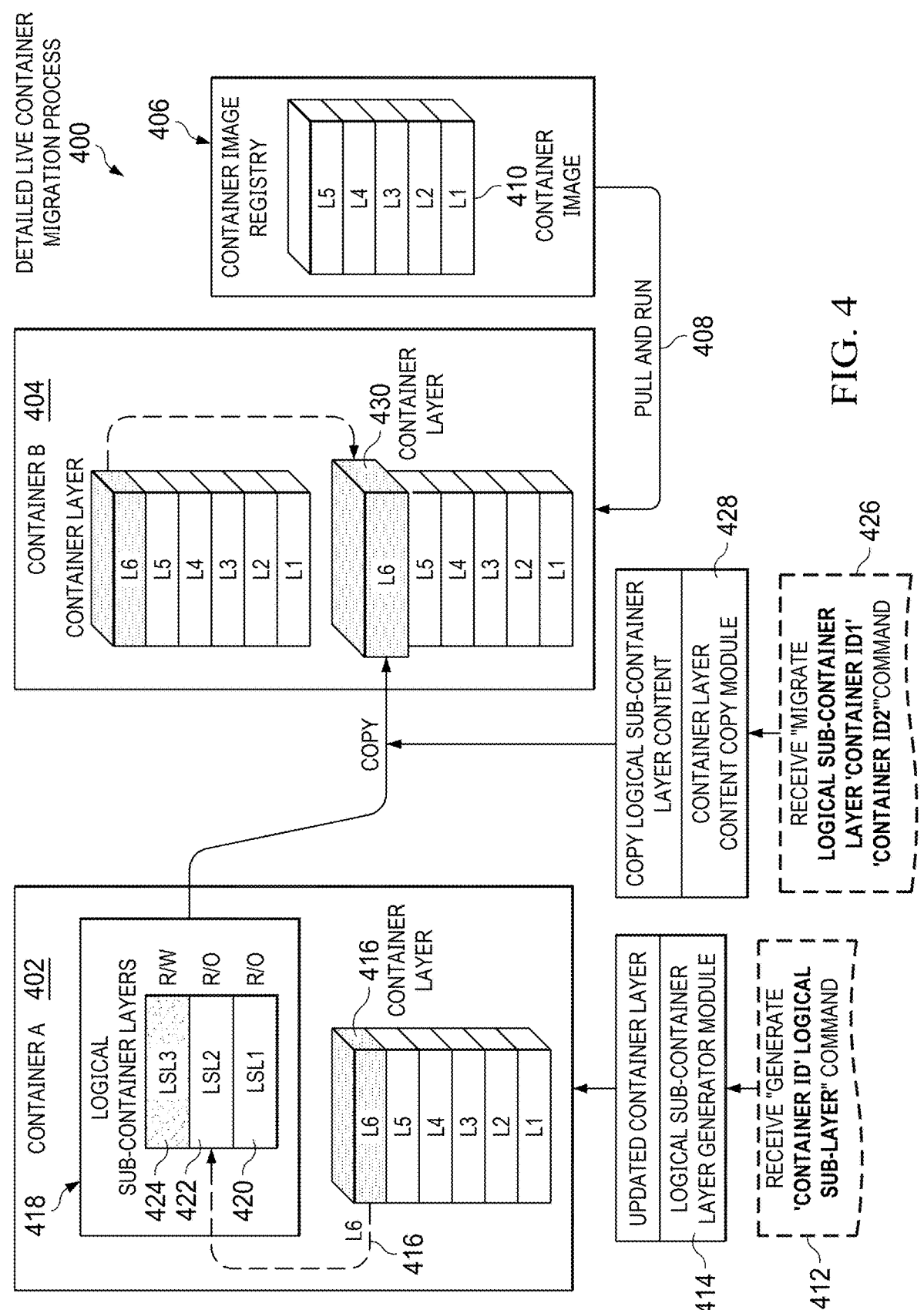
FIG. 4 is a diagram illustrating an example of a detailed live container migration process in accordance with an illustrative embodiment.

With reference now to FIG. 4, a diagram illustrating an example of a detailed live container migration process is depicted in accordance with an illustrative embodiment. Detailed live container migration process 400 may be implemented in a container-based environment, such as computing environment 100 in FIG. 1.

In this example, detailed live container migration process 400 includes container A 402, container B 404, and container image registry 406. Container A 402 may be, for example, container A 306 on host node A 302 in FIG. 3. Container B 404 may be, for example, container B 308 on host node B 304 in FIG. 3. Container image registry 406 may be, for example, container image registry 206 in FIG. 2. However, detailed live container migration process 400 is intended as an example only and not as a limitation on illustrative embodiments. For example, detailed live container migration process 400 may include any number of containers, container image registries, and other devices and components not shown.

In this example, at 408, the host node corresponding to container B 404 pulls container image 410 from container image registry 406 and runs container B 404 using container image 410. At 412, logical sub container layer generator module 414 receives a "generate 'container id' logical sub layer" command in response to updated files in container layer 416. Logical sub container layer generator module 414 may be, for example, logical sub container layer generator module 220 on host node 202 in FIG. 2. Logical sub container layer generator module 414 may receive the "generate 'container id' logical sub layer" command from a client device, such as client device 204 in FIG. 2.

In response to receiving the "generate 'container id' logical sub layer" command, logical sub container layer generator module 414 generates logical sub container layers 418 in container layer 416. In this example, logical sub container layers 418 includes logical sub layer (LSL) 1 420, LSL 2 422, and LSL 3 424. LSL 1 420 and LSL 2 422 are read only (R/O) layers of container layer 416. LSL 3 424 is the working read and write (R/W) layer of container layer 416.

At 426, container layer content copy module 428 receives a "migrate logical sub container layer 'container id1' 'container id2'" command from the client device to copy the logical sub container layer content from container A 402 to container B 404. Container layer content copy module 428 may be, for example, container layer content copy module 222 on host node 202 in FIG. 2.

In response to receiving the "migrate logical sub container layer 'container id1' 'container id2'" command, container layer content copy module 428 copies R/O layers, LSL 420 and LSL 422, to container layer 430 of container B 404. It should be noted that container layer content copy module 428 does not copy LSL 420 and LSL 422 to container layer 430 of container B 404 at the same time. In other words, container layer content copy module 428 copies LSL 420 to container layer 430 of container B 404 at time T1 after a first set of file changes occurred in container layer 416 and then copies LSL 422 to container layer 430 at time T2 after a second set of file changes occurred in container layer 416. Also, it should be noted that container layer content copy module 428 does not copy LSL 3 424 to container layer 430 of container B 404.

Figure 5:
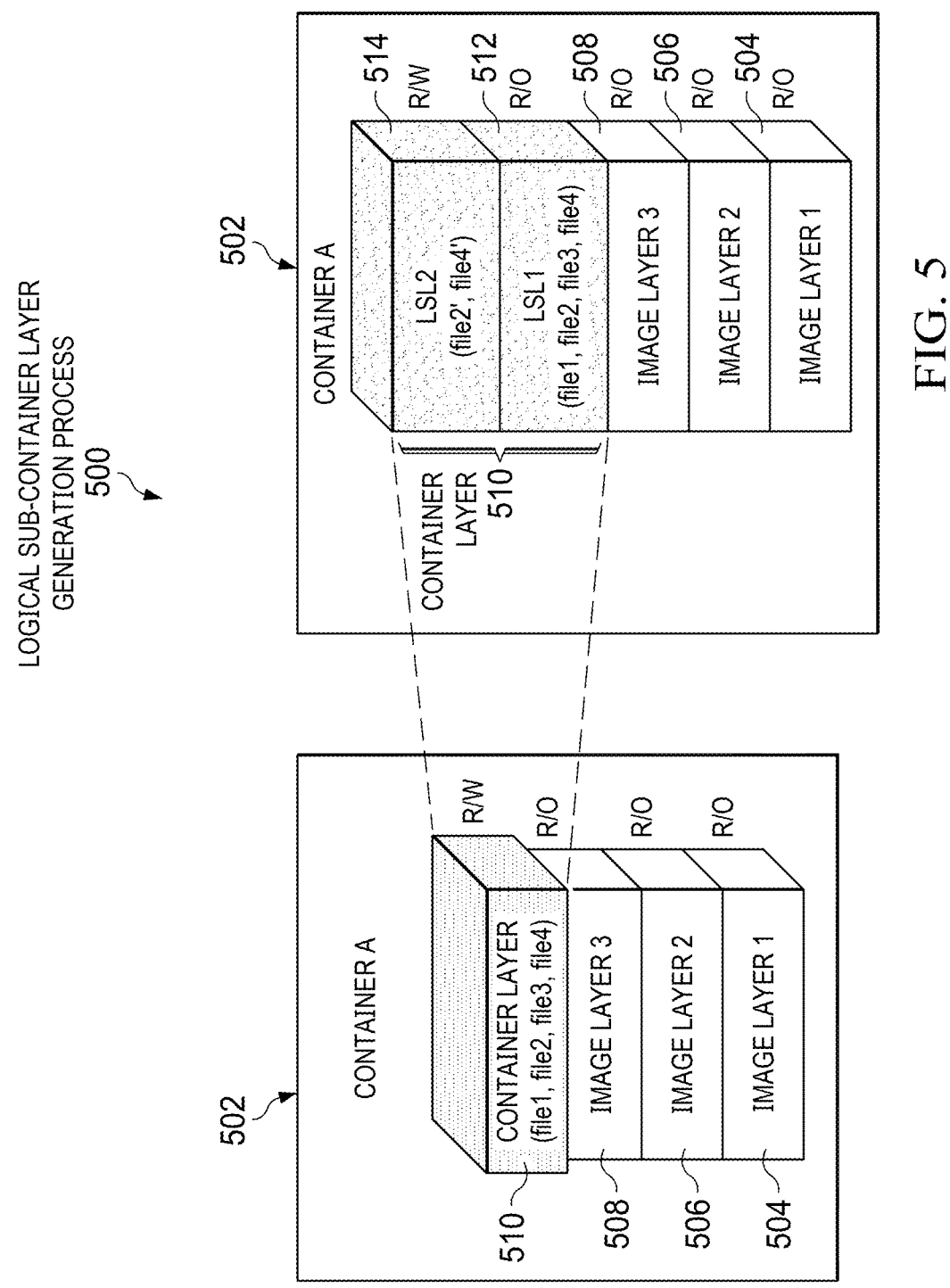
FIG. 5 is a diagram illustrating an example of a logical sub container layer generation process in accordance with an illustrative embodiment.

With reference now to FIG. 5, a diagram illustrating an example of a logical sub container layer generation process is depicted in accordance with an illustrative embodiment. Logical sub container layer generation process 500 is implemented in a logical sub container layer generator module, such as logical sub container layer generator module 220 in FIG. 2 or logical sub container layer generator module 414 in FIG. 4.

The logical sub container layer module triggers logical sub container layer generation process 500 in response to receiving a "generate 'container id' logical sub container layer" command. In this example, logical sub container layer generation process 500 includes container A 502, such as, for example, container A 306 in FIG. 3.

Container A 502 contains image layer 1 504, image layer 2 506, image layer 3 508 and container layer 510. Each of image layer 1 504, image layer 2 506, and image layer 3 508 is a read only (R/O) layer. The host node running container A 502 used each of image layer 1 504, image layer 2 506, and image layer 3 508 to build container A 502 at different stages. Container layer 510 is a read and write (R/W) layer that processes inputs and outputs while container A 502 is running.

In this example, container layer 510 includes file 1, file 2, file 3, and file 4. However, it should be noted that container layer 510 is intended as an example only and may include any number of files. In response to receiving the "generate 'container id' logical sub container layer" command after file 2 and file 4 are updated, the logical sub container layer module generates logical sub container layer (LSL) 1 512, which contains the original files 1, 2, 3, and 4. In addition, the logical sub container layer module marks LSL 1 512 as a R/O layer. Further, the logical sub container layer module generates LSL 2 514, which contains the updated files, file 2' and file 4'. Furthermore, the logical sub container layer module marks LSL 2 514 as the R/W layer of container layer 510 in container A 502.

Figure 6:
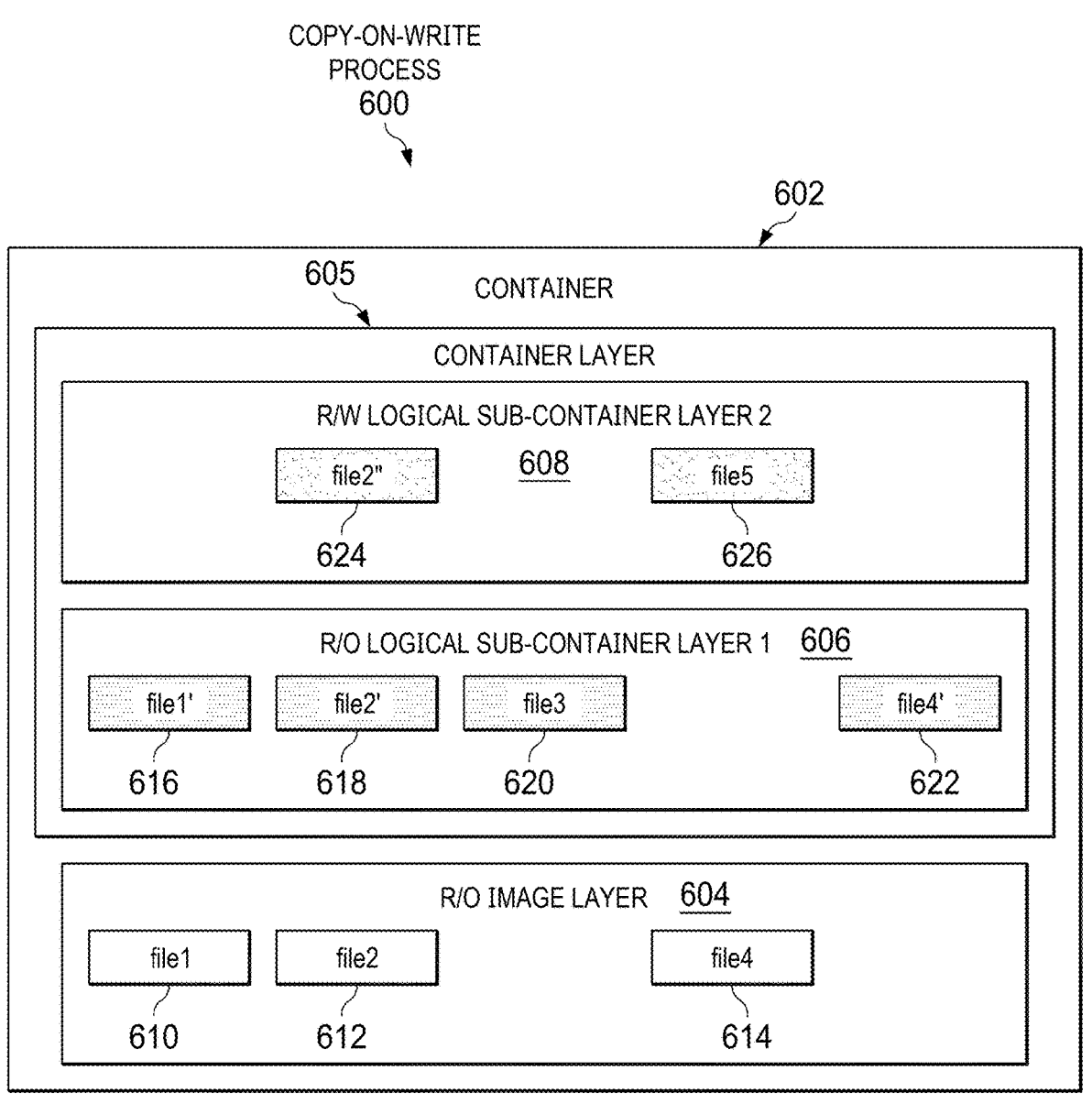
FIG. 6 is a diagram illustrating an example of a copy-on-write process in accordance with an illustrative embodiment.

With reference now to FIG. 6, a diagram illustrating an example of a copy-on-write process is depicted in accordance with an illustrative embodiment. Copy-on-write process 600 is implemented in a logical sub container layer generator module, such as logical sub container layer generator module 220 in FIG. 2 or logical sub container layer generator module 414 in FIG. 4.

In this example, copy-on-write process 600 includes container 602. Container 602 uses a union file system to store content. For example, container 602 includes a series of layers, such as read only (R/O) image layer 604, to store files corresponding to different container building stages. In this example, R/O image layer 604 includes file 1 610, file 2 612, and file 4 614.

The copy-on-write strategy triggers a copy-up operation when a set of files (e.g., file 1 610, file 2 612, and file 4 614) is updated, changed, or modified. Utilizing the copy-on-write strategy, the logical sub container layer generator module divides the original or initial container layer 605 into a plurality of logical sub container layers, such as, R/O logical sub container layer 1 606 and read and write (R/W) logical sub container layer 2 608.

In this example, R/O logical sub container layer 1 606 includes updated file 1' 616, updated file 2' 618, new file 3 620, and updated file 4' 622. R/W logical sub container layer 2 608 includes further updates file 2" 624 and new file 5 626.

Figure 7:
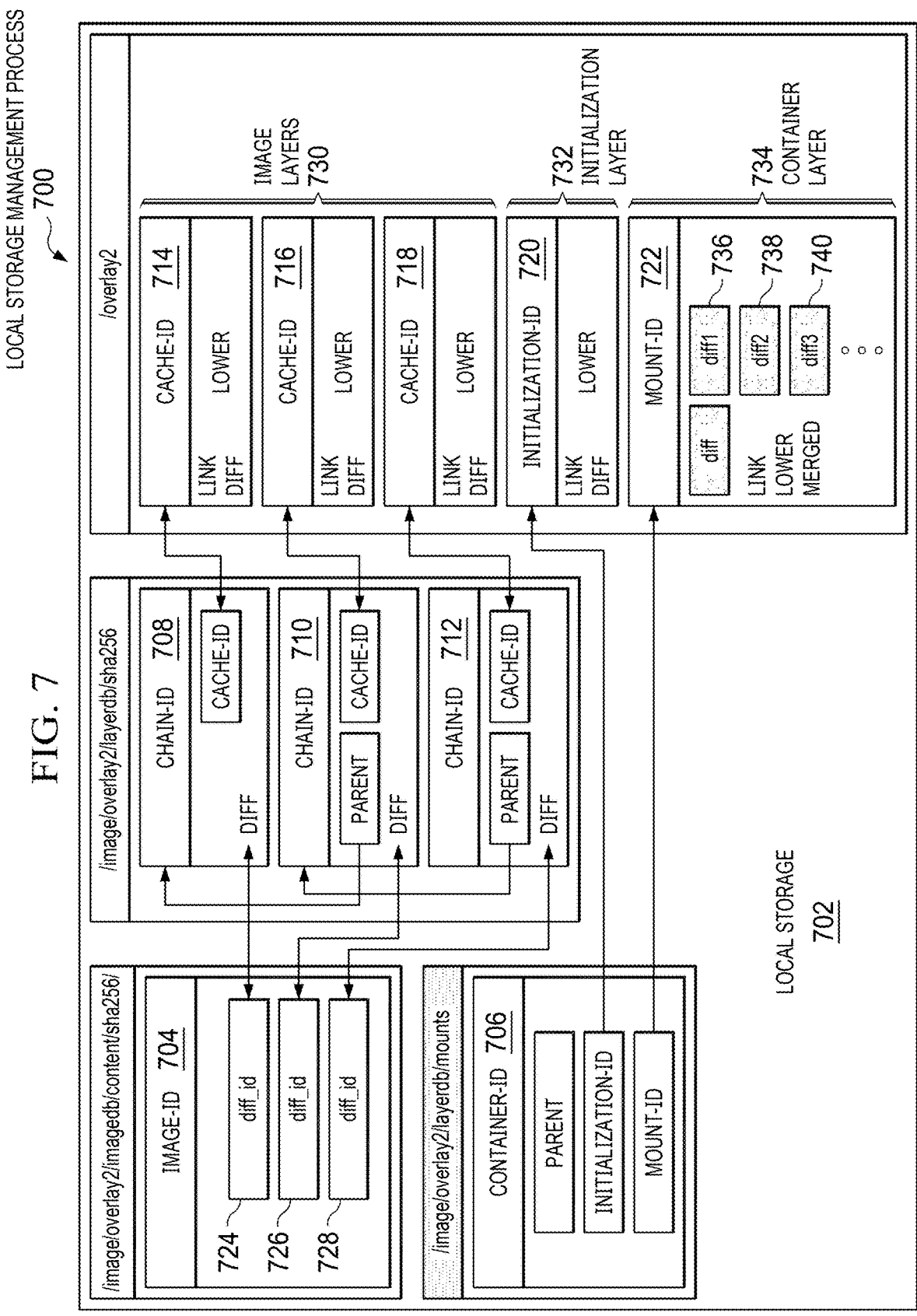
FIG. 7 is a diagram illustrating an example of a local storage management process in accordance with an illustrative embodiment.

With reference now to FIG. 7, a diagram illustrating an example of a local storage management process is depicted in accordance with an illustrative embodiment. Local storage management process 700 is implemented in local storage 702. Local storage 702 may be, for example, local storage 212 in FIG. 2.

In this example, local storage 702 contains image-identifier (id) 704, container-id 706, chain-id 708, chain-id 710, chain-id 712, cache-id 714, cache-id 716, cache-id 718, initialization-id 720, and mount-id 722. Image-id 704 includes difference (diff)-id 724, diff-id 726, and diff-id 728. Diff-id 724, diff-id 726, and diff-id 728 each correspond to a difference folder. A difference folder stores any file content updates or changes in the container layer corresponding to container-id 706. For example, a new file is added, an existing file is modified, and a previous file is deleted on the container layer. The changes to a particular file in the container layer are stored in a difference folder for that particular file.

Chain-id 708, chain-id 710, and chain-id 712 correspond to cache-id 714, cache-id 716, and cache-id 718, respectively, linking the difference folders associated with diff-id 724, diff-id 726, and diff-id 728. Each of cache-id 714, cache-id 716, and cache-id 718 corresponds to a given image layer of image layers 730 located in the container corresponding to container-id 706. Initialization-id corresponds to initialization layer 732, which is responsible for starting up the container. Mount-id 722 corresponds to container layer 734.

Container layer 734 of the container is associated with difference folder 1 (diff1) 736, diff2 738, and diff3 740. Each of diff1 736, diff2 738, and diff3 740 corresponds to a different logical sub container layer of container layer 734.

Figure 8:
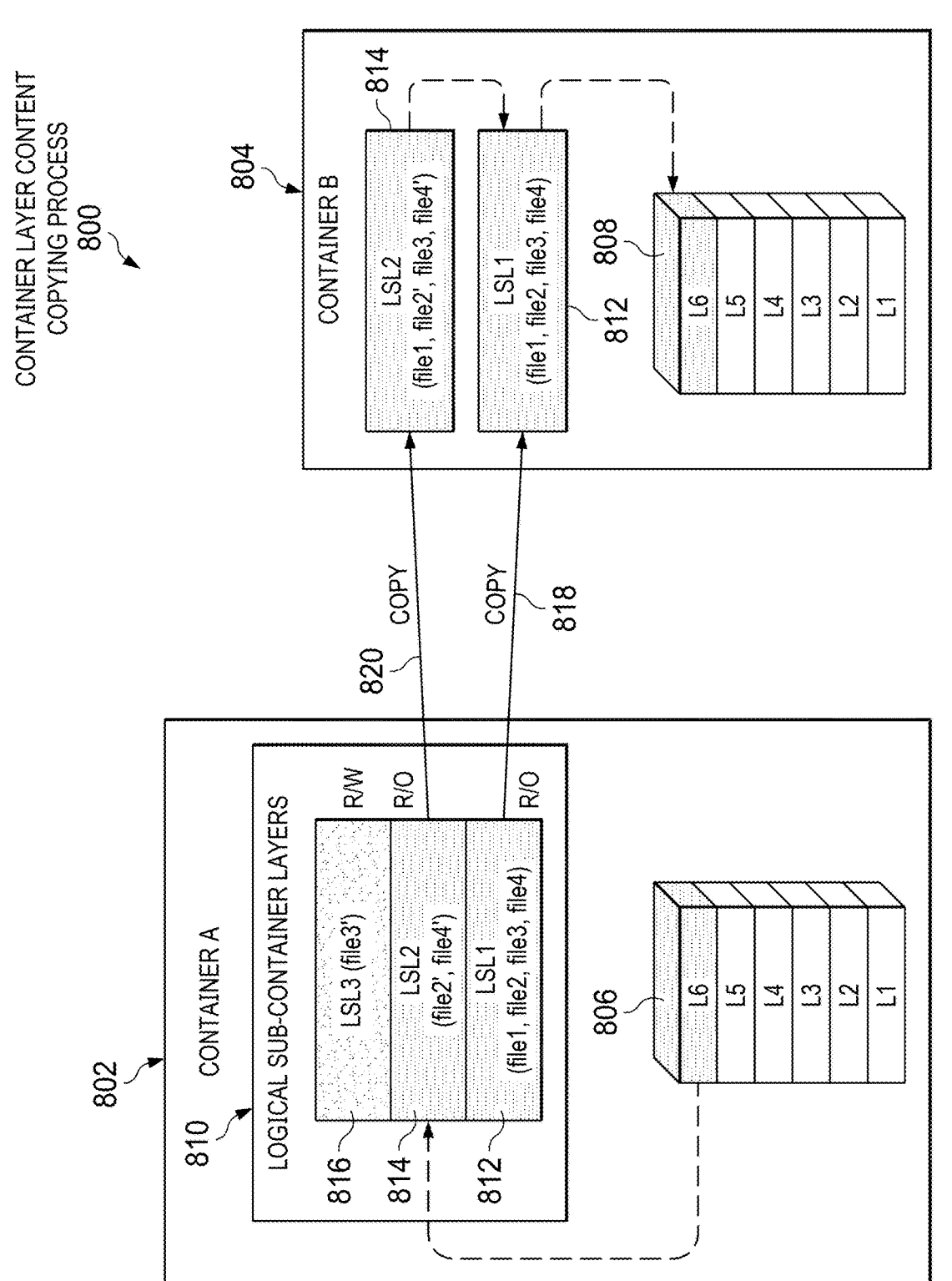
FIG. 8 is a diagram illustrating an example of a container layer content copying process in accordance with an illustrative embodiment.

With reference now to FIG. 8, a diagram illustrating an example of a container layer content copying process is depicted in accordance with an illustrative embodiment. Container layer content copying process 800 is implemented in a container layer content copy module, such as, for example, container layer content copy module 222 in FIG. 2 or container layer content copy module 428 in FIG. 4.

The container layer content copy module triggers container layer content copying process 800 in response to receiving a "migrate logical sub container layer 'container id1' 'container id2'" command. In this example, container layer content copying process 800 includes container A 802 and container B 804, such as, for example, container A 402 and container B 404 in FIG. 4.

Container A 802 contains container layer 806, such as, for example, container layer 416 in FIG. 4. Container B 804 contains container layer 808, such as, for example, container layer 430 in FIG. 4. It should be noted that a logical sub container layer generator module, such as, for example, logical sub container layer generator module 414 in FIG. 4, previously generated logical sub container layers 810 in container layer 806 in response to changes or updates to one or more files in container layer 806. Logical sub container layers 810 may be, for example, logical sub container layers 418 in FIG. 4.

In this example, logical sub container layers 810 include logical sub container layer (LSL) 1 812, LSL 2 814, and LSL 3 816. LSL 1 812 contains file 1, file 2, file 3, and file 4, which are the original files of container layer 806. LSL 2 814 contains file 2' and file 4', which are updates to original files 2 and 4. LSL 3 816 contains file 3', which is an update to original file 3 at a later time. LSL 1 812 and LSL 2 814 are read only (R/O) layers, whereas LSL 3 816 is a read and write (R/W) layer for container layer 806.

At 818, the container layer content copy module copies LSL 1 812 into container layer 808 of container B 804 in response to receiving the "migrate logical sub container layer 'container id1' 'container id2'" command at time T1 due to updated files 2' and 4'. Subsequently, at 820, the container layer content copy module copies LSL 2 814 into container layer 808 of container B 804 in response to receiving the "migrate logical sub container layer 'container id1' 'container id2'" command again at time T2 due to updated file 3'. It should be noted that the container layer content copy module will overwrite a file in container layer 808 when that file already exits.

With reference now to FIGS. 9A-9B, a flowchart illustrating a process for managing live container migration is shown in accordance with an illustrative embodiment. The process shown in FIGS. 9A-9B may be implemented in a computer, such as, for example, computer 101 in FIG. 1 or host node 202 in FIG. 2. For example, the process shown in FIGS. 9A-9B may be implemented by live container migration management code 200 in FIG. 1.

The process begins when a first computer receives an input to perform a live migration of a first container from the first computer to a second container located on a second computer in a container-based environment (step 902). The first container provides a service corresponding to a production system and includes one or more image layers and a container layer. The second computer pulls a container image corresponding to the first container from a container image registry and runs the second container on the second computer using the container image.

The first computer receives a result of a health check of the second container running on the second computer (step 904). The first computer makes a determination as to whether the result of the health check of the second container is pass (step 906). If the first computer determines that the result of the health check of the second container is not pass, no output of step 906, then the process returns to step 904 where the first computer waits to receive another health check of the container from the second computer. If the first computer determines that the result of the health check of the second container is pass, yes output of step 906, then the first computer identifies a set of changed files within a plurality of original files included in the container layer of the first container using a difference folder directory corresponding to the first container (step 908).

In response to identifying the set of changed files within the plurality of original files, the first computer utilizes the plurality of original files in the container layer of the first container as a first logical sub container layer within the container layer (step 910). In addition, the first computer copies the set of changed files in the container layer of the first container into a second logical sub container layer within the container layer (step 912).

Further, the first computer marks the first logical sub container layer that includes the plurality of original files as a read only logical sub container layer within the container layer (step 914). Furthermore, the first computer marks the second logical sub container layer that includes the set of changed files as a read and write logical sub container layer within the container layer (step 916).

The first computer utilizes the read and write logical sub container layer that includes the set of changed files within the container layer of the first container to continue processing inputs and outputs corresponding to the service provided by the first container to avoid interruption of the service during the live migration (step 918). The first computer also copies the read only logical sub container layer that includes the plurality of original files within the container layer of the first container to another container layer of the second container running on the second computer for the live migration without building the second container using the container image during the live migration (step 920). Thereafter, the process terminates.

Thus, illustrative embodiments of the present disclosure provide a computer-implemented method, computer system, and computer program product for managing live container migration from one computer to another to avoid service interruption. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

generating, by a first computer, a read and write logical sub container layer and a set of read only logical sub container layers within a read and write container layer of a first container that includes a plurality of read only image layers below the read and write container layer in response to identifying a current set of changed files within a plurality of original files included in the read and write container layer, the read and write logical sub container layer includes the current set of changed files and the set of read only logical sub container layers includes the plurality of original files of the read and write container layer and any changed files prior to the current set of changed files;

utilizing, by the first computer, the read and write logical sub container layer that includes the current set of changed files within the read and write container layer of the first container to continue processing inputs and outputs corresponding to a service provided by the first container to avoid interruption of the service during live migration, wherein the read and write sub container layer allows file changes during the live migration and is not copied; and copying, by the first computer, the set of read only logical sub container layers that includes the plurality of original files and the any changed files prior to the current set of changed files to another container layer of a second container running on a second computer for the live migration, wherein the second computer pulls a container image corresponding to the first container from a container image registry and runs the second container on the second computer using the container image prior to the live migration, and wherein the container image only includes the plurality of read only image layers corresponding to the first container that are not included in the set of read only logical sub container layers copied to the another container layer of the second container running on the second computer.

2. The method of claim 1, further comprising:

receiving, by the first computer, an input to perform the live migration of the first container from the first computer to the second container located on the second computer in a container-based environment, wherein the first container provides the service corresponding to a production system.

3. The method of claim 1, further comprising:

receiving, by the first computer, a result of a health check of the second container running on the second computer;

determining, by the first computer, whether the result of the health check of the second container is pass; and responsive to the first computer determining that the result of the health check of the second container is pass, identifying, by the first computer, the current set of changed files within the plurality of original files included in the read and write container layer of the first container using a difference folder directory corresponding to the first container.

4. The method of claim 1, further comprising:

utilizing, by the first computer, the plurality of original files in the read and write container layer of the first container as a first read only logical sub container layer within the read and write container layer and the any changed files prior to the current set of changed files as a second read only logical sub container layer within the read and write container layer in response to identifying the current set of changed files within the plurality of original files.

5. The method of claim 1, further comprising:

copying, by the first computer, the current set of changed files in the read and write container layer of the first container into the read and write logical sub container layer within the read and write container layer.

6. The method of claim 1, further comprising:

marking, by the first computer, a first read only logical sub container layer that includes the plurality of original files as the first read only logical sub container layer within the read and write container layer and a second read only logical sub container layer that includes the any changed files prior to the current set of changed files as the second read only logical sub container layer within the read and write container layer.

7. The method of claim 1, further comprising:

marking, by the first computer, the read and write logical sub container layer that includes the current set of changed files as the read and write logical sub container layer within the read and write container layer.

8. A computer system comprising:

a processor set;

one or more computer-readable storage media; and program instructions stored on the one or more computer-readable storage media to cause the processor set to perform operations comprising:

generating, by a first computer, a read and write logical sub container layer and a set of read only logical sub container layers within a read and write container layer of a first container that includes a plurality of read only image layers below the read and write container layer in response to identifying a current set of changed files within a plurality of original files included in the read and write container layer, the read and write logical sub container layer includes the current set of changed files and the set of read only logical sub container layers includes the plurality of original files of the read and write container layer and any changed files prior to the current set of changed files;

utilizing, by the first computer, the read and write logical sub container layer that includes the current set of changed files within the read and write container layer of the first container to continue processing inputs and outputs corresponding to a service provided by the first container to avoid interruption of the service during live migration, wherein the read and write sub container layer allows file changes during the live migration and is not copied; and copying, by the first computer, the set of read only logical sub container layers that includes the plurality of original files and the any changed files prior to the current set of changed files container layer of a second container running on a second computer for the live migration, wherein the second computer pulls a container image corresponding to the first container from a container image registry and runs the second container on the second computer using the container image prior to the live migration, and wherein the container image only includes the plurality of read only image layers corresponding to the first container that are not included in the set of read only logical sub container layers copied to the another container layer of the second container running on the second computer.

9. The computer system of claim 8, wherein the operations further comprise:

receiving, by the first computer, an input to perform the live migration of the first container from the first computer to the second container located on the second computer in a container-based environment, wherein the first container provides the service corresponding to a production system.

10. The computer system of claim 8, wherein the operations further comprise:

receiving, by the first computer, a result of a health check of the second container running on the second computer;

determining, by the first computer, whether the result of the health check of the second container is pass; and responsive to the first computer determining that the result of the health check of the second container is pass, identifying, by the first computer, the current set of changed files within the plurality of original files included in the read and write container layer of the first container using a difference folder directory corresponding to the first container.

11. The computer system of claim 8, wherein the operations further comprise:

utilizing, by the first computer, the plurality of original files in the read and write container layer of the first container as a first read only logical sub container layer within the read and write container layer and the any changed files prior to the current set of changed files as a second read only logical sub container layer within the read and write container layer in response to identifying the current set of changed files within the plurality of original files.

12. The computer system of claim 8, wherein the operations further comprise:

copying, by the first computer, the current set of changed files in the read and write container layer of the first container into the read and write logical sub container layer within the read and write container layer.

13. The computer system of claim 8, wherein the operations further comprise:

marking, by the first computer, a first read only logical sub container layer that includes the plurality of original files as the first read only logical sub container layer within the read and write container layer and a second read only logical sub container layer that includes the any changed files prior to the current set of changed files as the second read only logical sub container layer within the read and write container layer; and marking, by the first computer, the read and write logical sub container layer that includes the current set of changed files as the read and write logical sub container layer within the read and write container layer.

14. A computer program product comprising:

one or more computer-readable storage media; and program instructions stored on the one or more computer-readable storage media to perform operations comprising:

generating, by a first computer, a read and write logical sub container layer and a set of read only logical sub container layers within a read and write container layer of a first container that includes a plurality of read only image layers below the read and write container layer in response to identifying a current set of changed files within a plurality of original files included in the read and write container layer, the read and write logical sub container layer includes the current set of changed files and the set of read only logical sub container layers includes the plurality of original files of the read and write container layer and any changed files prior to the current set of changed files;

utilizing, by the first computer, the read and write logical sub container layer that includes the current set of changed files within the read and write container layer of the first container to continue processing inputs and outputs corresponding to a service provided by the first container to avoid interruption of the service during live migration, wherein the read and write sub container layer allows file changes during the live migration and is not copied; and copying, by the first computer, the set of read only logical sub container layers that includes the plurality of original files and the any changed files prior to the current set of changed files to another container layer of a second container running on a second computer for the live migration, wherein the second computer pulls a container image corresponding to the first container from a container image registry and runs the second container on the second computer using the container image prior to the live migration, and wherein the container image only includes the plurality of read only image layers corresponding to the first container that are not included in the set of read only logical sub container layers copied to the another container layer of the second container running on the second computer.

15. The computer program product of claim 14, wherein the operations further comprise:

receiving, by the first computer, an input to perform the live migration of the first container from the first computer to the second container located on the second computer in a container-based environment, wherein the first container provides the service corresponding to a production system.

16. The computer program product of claim 14, wherein the operations further comprise:

receiving, by the first computer, a result of a health check of the second container running on the second computer;

determining, by the first computer, whether the result of the health check of the second container is pass; and responsive to the first computer determining that the result of the health check of the second container is pass, identifying, by the first computer, the current set of changed files within the plurality of original files included in the read and write container layer of the first container using a difference folder directory corresponding to the first container.

17. The computer program product of claim 14, wherein the operations further comprise:

utilizing, by the first computer, the plurality of original files in the read and write container layer of the first container as a first read only logical sub container layer within the read and write container layer and the any changed files prior to the current set of changed files as a second read only logical sub container layer within the read and write container layer in response to identifying the current set of changed files within the plurality of original files.

18. The computer program product of claim 14, wherein the operations further comprise:

copying, by the first computer, the current set of changed files in the read and write container layer of the first container into the read and write logical sub container layer within the read and write container layer.

19. The computer program product of claim 14, wherein the operations further comprise:

marking, by the first computer, a first read only logical sub container layer that includes the plurality of original files as the first read only logical sub container layer within the read and write container layer and a second read only logical sub container layer that includes the any changed files prior to the current set of changed files as the second read only logical sub container layer within the read and write container layer.

20. The computer program product of claim 14, wherein the operations further comprise:

marking, by the first computer, the read and write logical sub container layer that includes the current set of changed files as the read and write logical sub container layer within the read and write container layer.

\* \* \* \* \*